United States Patent [19]
Edwards

[11] 3,751,715
[45] Aug. 7, 1973

[54] IONIC WIND MACHINE

[76] Inventor: Harrison F. Edwards, 79 S. Broad St., Norwich, N.Y.

[22] Filed: July 24, 1972

[21] Appl. No.: 274,201

[52] U.S. Cl............... 317/4, 55/118, 313/355, 317/262 A, 417/48
[51] Int. Cl. ............................................. H05h 5/06
[58] Field of Search .................. 317/4, 262 A, 2 F; 417/48, 49, 51; 55/115, 118; 313/328, 355

[56] References Cited
UNITED STATES PATENTS

| 3,699,387 | 10/1972 | Edwards | 317/4 |
| 3,634,726 | 1/1972 | Jay | 317/2 F |
| 3,612,864 | 10/1971 | Tamai | 313/355 |
| 2,507,434 | 5/1950 | De Lany et al. | 313/328 |

Primary Examiner—J. D. Miller
Assistant Examiner—Harry E. Moose, Jr.
Attorney—Robert E. Le Blanc, Leonard F. Stoll et al.

[57] ABSTRACT

Disclosed is a wind generating machine with no moving parts. A thin corona wire is located adjacent a wire mesh and a potential gradient of from 7,000 to 20,000 volts causes air to flow in a direction from the wire toward the mesh. The air flow is voltage sensitive. Several stages may be provided and the mesh may form part of a continuous belt. A rigid self-contained assembly is provided by physically connecting the wire and mesh. In other forms, a dielectric coated wire or a liquid, for example, water, is utilized in lieu of the thin corona wire.

17 Claims, 15 Drawing Figures

PATENTED AUG 7 1973

IONIC WIND MACHINE

This application is a continuation-in-part of my prior copending application, Ser. No. 49,714 filed June 25, 1970 now U.S. Pat. No. 3,699,387.

This invention relates to an electrical device for moving air and other fluids having no moving parts and more particularly to a machine in which air flow is generated due to the interaction of ions with an electrostatic field. While particularly constructed to optimize air flow, the device of the present invention also acts as an electrostatic precipitator for filtering smoke, dust particles, and the like from the air.

Ionic wind generation machines have been known for some time and generally include one or more point sources having a high electrical potential of one polarity spaced from an ion collector of opposite polarity. The electrostatic field between the point source and the collector produces a flow of air between the accordance in association with a corona-type discharge, sometimes referred to as tapes. In "electric wind." advantageously operated The exact mechanism of air acceleration producing the air flow is not fully understood but is believed due to the production of ions which are accelerated away from the point source towards the collector plate of opposite polarity. It is believed that ions are generated by the corona discharge and that some of these ions in accelerating towards the collector plate strike molecules to produce secondary ions, resulting in a cumulative effect whereby air flow is generated in the electrostatic field existing in the region between the oppositely charged electrodes. The magnitude and direction of air flow is independent of electrode polarity and in all instances flows from the point source toward the collector plate.

In previous constructions, the collector plates have taken a variety of shapes but the corona electrode has either been a single rod or a few wires spaced in one or two small concentric circles to simulate a plurality of point sources. The multiple point source electrodes have an appearance somewhat resembling a brush and are sometimes referred to as brush electrodes. The necessity for simulating point sources has placed severe limitations on the efficiency and economic practicability of previous electrical wind generators in that the so-called brush electrodes are difficult and expensive to fabricate and the relatively few point sources located near the central path of the air flow necessarily limited the quantities of air which could be efficiently propelled by the machines. In addition, the point sources or brush electrodes do not represent an optimum construction for obtaining electrostatic precipitation so that the filtering action of previous constructions has been extremely limited.

The present invention is based on the discovery that the so-called "electric wind" can be generated using corona electrodes of completely different construction and ones which do not resemble the point sources of previous constructions. In particular, it has been found that the corona discharge is generated as a surrounding sheath along the length of an extremely fine wire when this wire is placed in the vicinity of an oppositely charged electrode or wire mesh forming a ground plane substantially parallel to the plane of the fine corona wire. With this construction, the air flow is substantially independent of air conduit cross section so that vast quantities of air can be moved at a minimum of expense. That is, the quantity of air movable with the device of this invention is directly proportional to the area of the wire mesh forming the collector plate and to the area spanned by the thin corona wire, both of which can be economically made extremely great. The elongated corona wire and wire mesh or screen construction provides increased precipitating action and collection of foreign matter on the collector screen so that enhanced filtering action is possible. This construction and its resemblance to more or less conventional precipitator designs renders the keys transmission ionic wind machine of the present invention particularly adapted for use as a wind generating electrical precipitator, either by itself or in conjunction with additional precipitator electrodes. Since the velocity or rate of air flow is within wide limits, almost directly proportional to the applied voltage, the amount of the air flow is readily controlled through the use of a conventional Variac or other variable impedance element electrically connected to the power supply.

In addition to the flexible digit tapes, the present invention involves the other three principal components of the cash register which coact with the flexible digit tapes. These include the keyboard, the accumulator, and the indicator or display assembly. The accumulator and the display assemblies both utilize indicator wheels having outer surfaces which rotate a distance equal to the travel of the associated digit tapes. The accumulator assembly and the display assembly both include two sets of interleaved indicator wheels which are mounted on the same shaft and have two sets of digital information mounted on interleaved indicator wheels. In the case of the accumulator, the information is the item total (alternatively designated the subtotal throughout this specification) and the grand total, while in the case of the clerk and customer indicator or display wheels, one set of interleaved wheels carries the display for the sales clerk and the other for the customer. In both cases, arrangements are provided for spaced windows to selectively view either of the two sets of digital information while blocking the other set of information.

In the present invention, a relatively thin wire having a diameter no greater than about 0.020 inch is preferably suspended in zig-zag fashion throughout the cross section of an air duct so that the successive strands of the corona wire all lie in substantially a single plane transverse to the flow of air through the duct. A collector plate, preferably in the form of a conductive wire mesh, is spaced about an inch from the corona wire and extends completely across the duct in a plane parallel to the plane of the corona wire strands. When one of these electrodes is connected to a potential source, in the neighborhood of about 7,000 to 20,000 volts, air flow is induced in the region between the electrodes along the longitudinal axis of the duct and in a direction extending from the fine corona wire toward the wire mesh. In the preferred embodiment, the wire mesh or collector electrode is grounded and the corona wire is electrically connected to the active side of the power supply, either + or −, to produce the electronic wind. Ions are accelerated in the electrostatic field and ionized particles of smoke, dust, dirt, and other biasing materials in the air are collected on the wire mesh by the so-called Cotrell effect forming the basis for many electrostatic precipitators. Since the "electric wind" is independent of polarity, the electrodes may be connected to A.C. source and wind generated even at frequencies up to and including R.F. frequencies.

In another embodiment of this invention, an enhancement of the "electric the is realized when a fine wire is coated with a dielectric or electrical insulating material and used as previously discussed in association with the collector plate. It is believed that this enhancement of the wind effect is due to the greater number of ions produced in utilizing the dielectric coated wire in comparison of the a bare metal wire. That is, a molecular disassociation occurs when any wire is subjected to an intense electrical field and this disassociation produces ions in addition to those available in ambient air. By utilizing a dielectric coated wire, additional ions are believed produced which, in turn, generate secondary ions and result in enhanced air flow.

Consonant with the foregoing, there is provided in the further form of the present invention a liquid electrode used in lieu of the Corona wire and in association with the collector plate previously described. For example, water can be used as the electrode opposite the collector plate. The use of water obtains many advantages apart from its apparent ability to make available a large number of ions, in that it is readily available, has a naturally high vapor pressure and is a good electrical conductor. The water, in fact, serves as a liquid Corona wire. In still further forms hereof, water soaked yarn or thread or other strands of material can be utilized to achieve a Corona discharge sufficient for present purposes.

It is therefore one object of the present invention to provide an improved wind generating device having no moving parts.

Another object of the present invention is to provide an ionic wind machine or wind generator having an improved corona electrode.

Another object of the present invention is to provide an ionic wind machine in which the corona electrode may be in the form of a continuous and relatively fine wire, a dielectric coated wire, a liquid, or a liquid coated strand.

Another object of the present invention is to provide an improved ionic wind generator having increased electrostatic precipitation action.

Another object of the present invention is to provide an ionic wind machine in which the flow rate is almost directly proportional to the applied voltage over a wide range of voltages.

Another object of the present invention is to provide an ionic wind machine in which the quantities of air which can be economically moved are almost unlimited and dependent solely on the area spanned by the wire electrodes.

Another object of the present invention is to provide an ionic wind generator particularly adapted for use with ionic precipitators.

These and further objects and advantages of the invention will be more apparent upon reference to the following specification, claims, and appended drawings, wherein:

Figures 1, 2, 4:
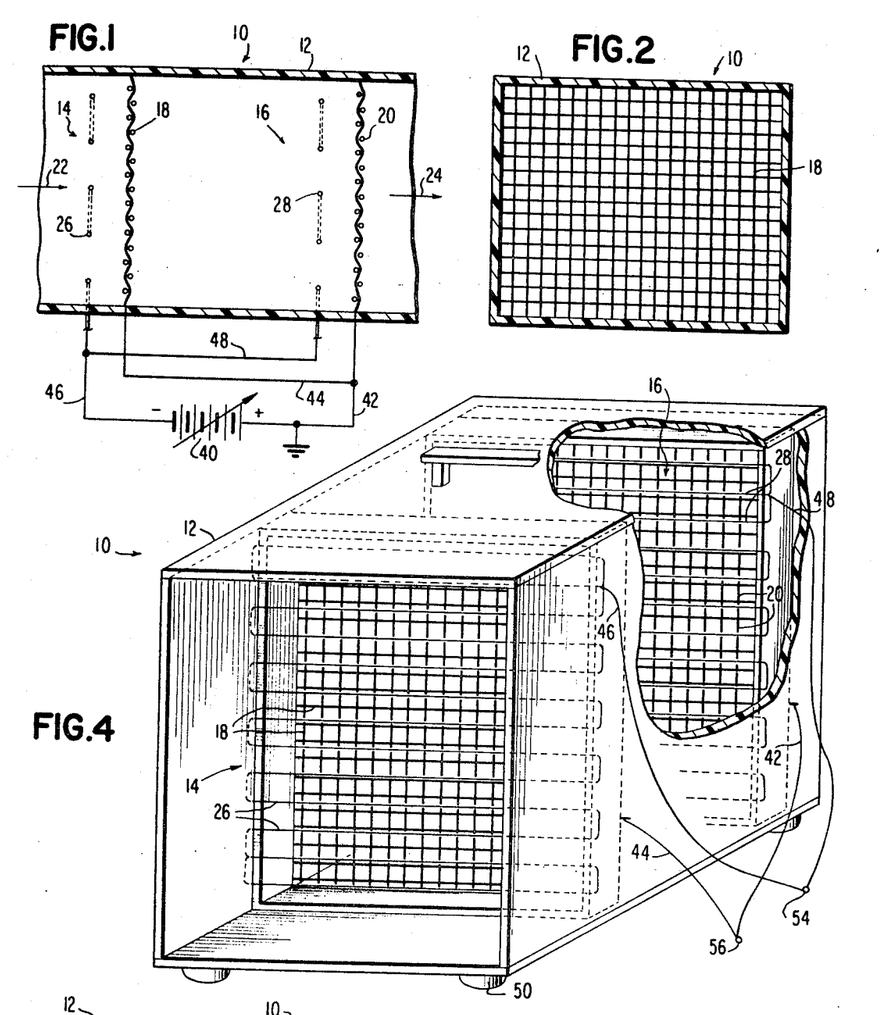
FIG. 1 is a an schematic diagram showing a two-stage wind machine constructed in accordance with the present invention.
FIG. 2 is a view taken at right angles to FIG. 1 showing the grounded electrode or wire mesh collector screen of the wind machine of FIG. 1.
FIG. 4 is a perspective view of a wind machine of the type illustrated in FIG. 1 constructed in accordance with the present invention.

Referring to the drawings, the novel wind machine of the present invention is generally indicated at 10 in FIG. 1 and comprises a duct 12 for air, exhaust gases, or any other dielectric fluid which may be propelled under the influence of an electrostatic field. In the preferred embodiment, duct 12 is of rectangular cross section and is formed of a suitable electrical insulating material, such as plexiglas or other plastic. The wind machine 10 in FIG. 1 is illustrated as having two separate spaced stages, generally indicated at 14 and 16, respectively, but it is understood that one or more stages may be employed as desired. The electric wind effect is cumulative in that two stages produce almost twice the wind as a single stage, three stages almost three times, and so on, except for friction and other losses in the system as the air flow is increased.

Figure 3:
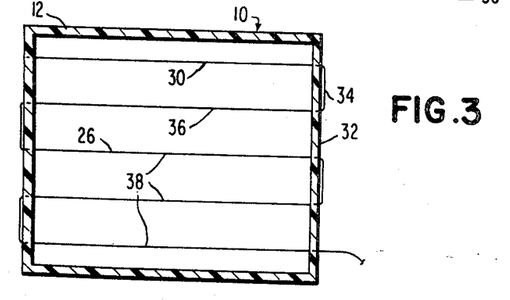
FIG. 3 is a similar view taken at right angles to that of FIG. 1 showing the fine wire corona electrode in one of the stages of the wind machine of FIG. 1.

Extending transversely across the duct 12 are a pair of identical collector plates or collector screens 18 and 20, the former being illustrated in FIG. 2, which is a view taken at right angles to the view in FIG. 1. Screens 18 and 20 preferably take the form of a relatively open conductive wire mesh with openings sufficiently large such that the screen does not unduly impede the flow of air along the conduit in the direction of the arrows 22 and 24 in FIG. 1. Positioned upstream of collector meshes 18 and 20 are identical corona wires 26 and 28, the former being illustrated in FIG. 3 which is also a view taken at right angles to the view of FIG. 1 through conduit 12. Corona electrode 26 preferably takes the form of a single continuous wire which has a first or top strand 30 extending completely across conduit 12 and through a suitable aperture in the conduit where it is looped to overlie a portion of the sidewall 32 of the conduit as at 34 and passes back through a second aperture to form the next lower strand 36. Electrode 28 is similarly looped and zig-zagged back and forth to form the subsequent strands 38 such that the wire zig-zags back and forth over the entire cross sectional area of the conduit to form the parallel strands, all lying in a plane parallel to the plane of the wire mesh 18 and transverse to the flow axis of the air through conduit 12. A variable D.C. power supply 40 is illustrated in FIG. 1 as having its positive or grounded side connected by wires 42 and 44 to the conductive wire meshes or collectors 18 and 20. The negative side of the variable D.C. power supply 40 is connected by leads 46 and 48 to the two corona wires 26 and 28 of the two wind machines stages 14 and 16. rack as As the potential of source 40 is increased to about 7,000 volts, a flow of air is induced longitudinally of the conduit in the direction of the arrows 22 and 24 in FIG. 1. The rate of flow of the air through the conduit (neglecting losses) increases almost linearly with further increases in the voltage source 40 up to and including a voltage value of about 20,000 volts. In addition to the voltage sensitive propulsion of air, it has been found that substantial precipitation takes place with a substantial collection of smoke, dust, dirt, and other particles which may be carried by the air onto the collector electrodes or meshes 18 and 20. No significant change in flow is noted by disconnecting electrodes 18 and 20 from ground nor does a reversal of the polarity of source 40 have any significant effect on the direction of air flow or the quantity of air moved by the device for a given potential. That is, the polarity of battery 40 may be reversed and the same wind generating effect is noted. By having the corona electrodes 26 and 28 connected to the negative side of the power supply, a slightly better precipitating action is obtained onto meshes 18 and 20.

FIG. 4 shows an embodiment of an actual wind machine constructed in accordance with the present invention and comprising rectangular cross through 129 12 made of plexiglas and having an overall width of 10 inches, an overall when of 11 inches, and an overall length of 12 inches. The bottom of the conduit was provided with short legs 50 and connected to the top of the conduit is a handle 52 so that the machine can be carried about for the purposes of display. In the preferred construction for the embodiment of FIG. 4, the corona wires 26 and 28 were made of No. 31 gage magnetic copper wire having a diameter of 0.010 inch. The diameter of the wire forming the corona electrodes 26 and 28 has been found quite critical and the wind effect is substantially reduced when the wire diameter is increased above about 0.020 inch. For this reason, it is believed that a wire diameter of 0.020 inch or less is essential for obtaining the corona effect and the smaller the diameter of the corona wire, the better the wind generation. The only limit as to a reduction in wire size is the decreasing physical strength of the wire and its ability to support itself in spans across the duct so that wire having a diameter of 0.010 inch has been found very suitable. In the same embodiment, the two collector meshes 18 and 20 took the form of an open mesh of galvanized mild steel having rectangular openings between wire strands approximately one-fourth inch on each side. The diameter of the wire for the wire meshes 18 and 20 is not critical, the only requirement being that effectively mesh have sufficient and metal to form a good ground plane adjacent the corona wires, while at the same time having sufficient open space between strands so as to not unduly impede the flow of air along the conduit. In the embodiment of FIG. 4, the corona wire, such as the wires 26 and 28, are spaced apart approximately 1 inch from the corresponding meshes 18 and 20. The electric wind effect becomes noticeable when the electric field between the corona wires and the mesh exceeds about 7,000 volts per linear inch, so that with a one at least the electric wind effect begins when the source potential reaches about 7,000 volts. The preferred spacing between successive parallel strands of the corona wires 26 and 28 is about 1 ½ inches between the centerlines of adjacent strands. Again, this spacing is not critical and noticeable wind effects have been noted with strand spacings of as little as three-fourths inch.

In operating shows device of FIG. 4 in a dark room, a sheath of corona discharge is noted along the length of the corona wires 26 and 28. This discharge appears to create a fan-shaped visible glow between the corona wire and the collector screen. The major included angle between the collector screen and the corona wire is approximately 30°. The glow is visible in subdued daylight and the color is primarily violet reaching into ultraviolet. With the power supply adjusted to give a potential of approximately 15,000 volts, the air flow through the machine then of FIG. 4 is at a rate of over 300 linear feet per minute. This rate is reduced almost to half by disconnecting one of the stages from the power supply.

Figure 5:
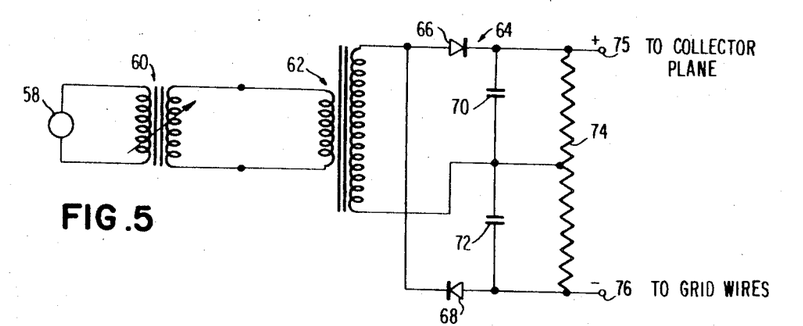
FIG. 5 is a circuit diagram of a D.C. power supply usable with the wind machine of FIG. 4.

FIG. 5 shows a D.C. power supply for the wind machine 10 of FIG. 4 connectable to the terminals 54 and 56 for the leads 48 and 46 to the corona wires and for the leads 42 and 44 of the collector meshes, respectively. A conventional 110 volt, 60 Hz source 58, such as a conventional power main outlet, supplies an A.C. signal to the primary of a variable transformer 60. The secondary of transformer 60, which may be in the form of a conventional Variac, is transformer coupled as at 62 to a rectifier-doubling circuit 64, including rectifier diodes 66 and 68, capacitors 70 and 72, and a variable tap bleed resistor 74. The positive side of the output at terminal 75 is connected to the collector plane terminal 56 of FIG. 5, whereas the negative side of the power supply output at terminal 76 is connected to the corona grid wire terminal 54 in FIG. 4. These terminals can be reversed if desired.

Figure 6:
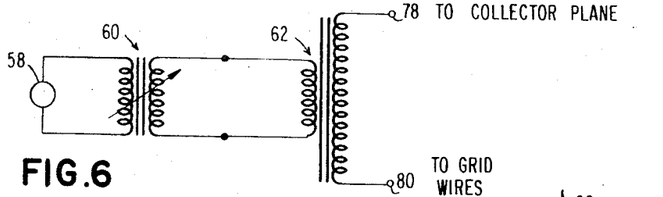
FIG. 6 is a circuit diagram of an A.C. power supply usable with the wind machine of FIG. 4.

FIG. 6 shows a circuit diagram for an A.C. power supply for the wind machine 10 of FIG. 4 with like parts bearing like reference numerals. Again, a conventional 110 volt, 60 Hz source 58 is connected through variable transformer 60 and stepup transformer 62 to a pair of output terminals 78 and 80 connected to the secondary of transformer 62. Terminal 78 is connected to terminal 54 in FIG. 4 and output terminal 80 of FIG. 6 is connected to terminal 56 in FIG. 4. Since the circuit of FIG. 6 produces an A.C. output, these connections can obviously be reversed if desired. It has been found that when operating from an A.C. power supply, the wind effect is reduced to about 70 percent of the wind generated by a D.C. supply of the same voltage. However, the A.C. supply is more economical, particularly when operated at higher frequencies up to and including R.F. frequencies. The direction of wind flow is the same for A.C. as it is for D.C. of either polarity.

Figure 7:
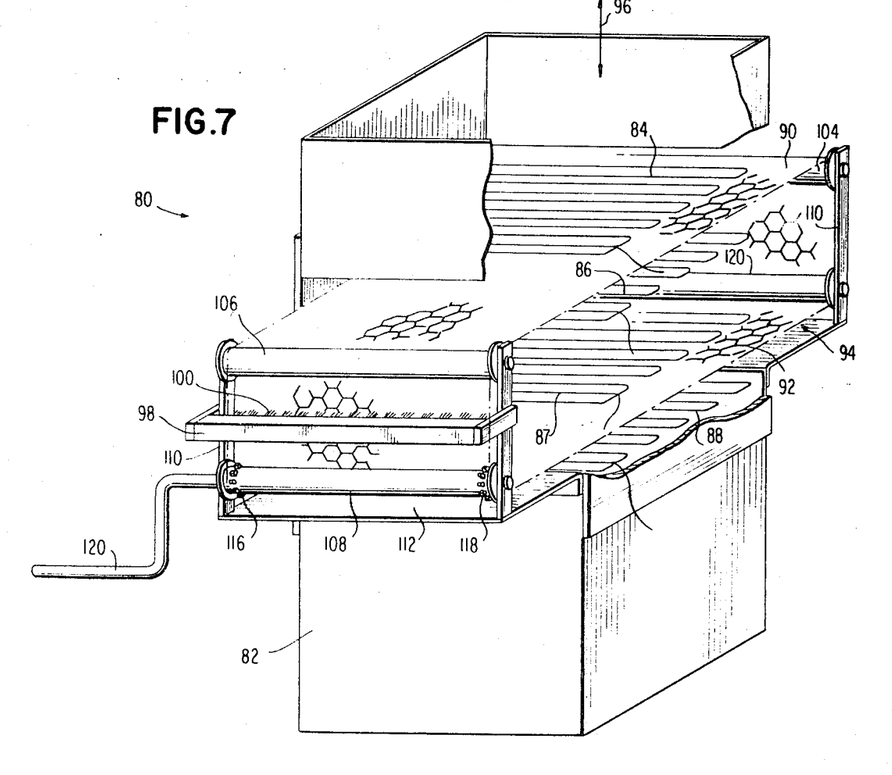
FIG. 7 shows a modified wind machine construction in which the collector electrodes take the form of a continuous belt of flexible mesh material.

FIG. 7 shows a modified wind machine constructed in accordance with the extent. invention and generally indicated % at 80. The wind machine again comprises a rectangular duct 82 of suitable electrical insulating material, such as plastic or the like. Extending across the duct 82 at spaced locations in FIG. 7 are four corona wires 84, 86, 87, and 88, which are in all respects identical to the two corona wires 26 and 28 of FIGS. 1 and 4. Passing between corona wires 84 and 86 is a length of flexible metal belt or screen 90 and similarly passing between corona wires 87 and 88 is a second length 92 of flexible metal belt, generally indicated at 94. Belt 94 is both flexible and continuous and the lengths 90 and 92 form the collector electrodes for the corona wires 84, 86, 87, and 88. Four corona wires are illustrated in FIG. 7 so that air may be driven in either direction as indicated by the double ended arrow 96 in FIG. 7. It is understood that only two of the corona wires are energized at any one time, namely, corona wires 84 and 87 are energized if the direction of air flow is to be downwardly in FIG. 7, whereas only corona wires 86 and 88 are energized for upward air flow through the duct 82 in FIG. 7. The spacing between the lengths of belt 94 and the respective corona wires is illustrated in the drawing.

An additional important feature of the embodiment of FIG. 7 resides in the fact that collector belt 94 is continuous and extends externally of duct 82 where it may be cleaned externally of the duct, such as by a dirt removal brush 98 which engages the screen to brush off any collected particles on the screen at 100. Belt 94 is passed over four rollers 102, 104, 106, and 108 mounted on uprights 110, in turn supported by brackets 112 and 114 extending outwardly from opposite sidewalls of the duct. Roller 108 is preferably provided with gears 116 and 118 at each end adapted to engage the meshes of belt 94 to drive it when the crank 120 connected to roller 108 is manually rotated. Belt 94 is preferably grounded through one or more of the rollers and uprights 110 and a suitable high voltage connection (not shown) is made to suitable pairs of the corona wires 84, 86, 87, and 88. It is apparent that instead of a brush 98, the belt 94 may be cleaned by passing it through a suitable solution, through a blower, or through other cleaning apparatus as desired. In addition, belt 94 may be automatically driven either continuously or intermittently, depending upon the amount of air or gas impurities collected on it by electrostatic precipitation.

Figures 8, 9, 10:
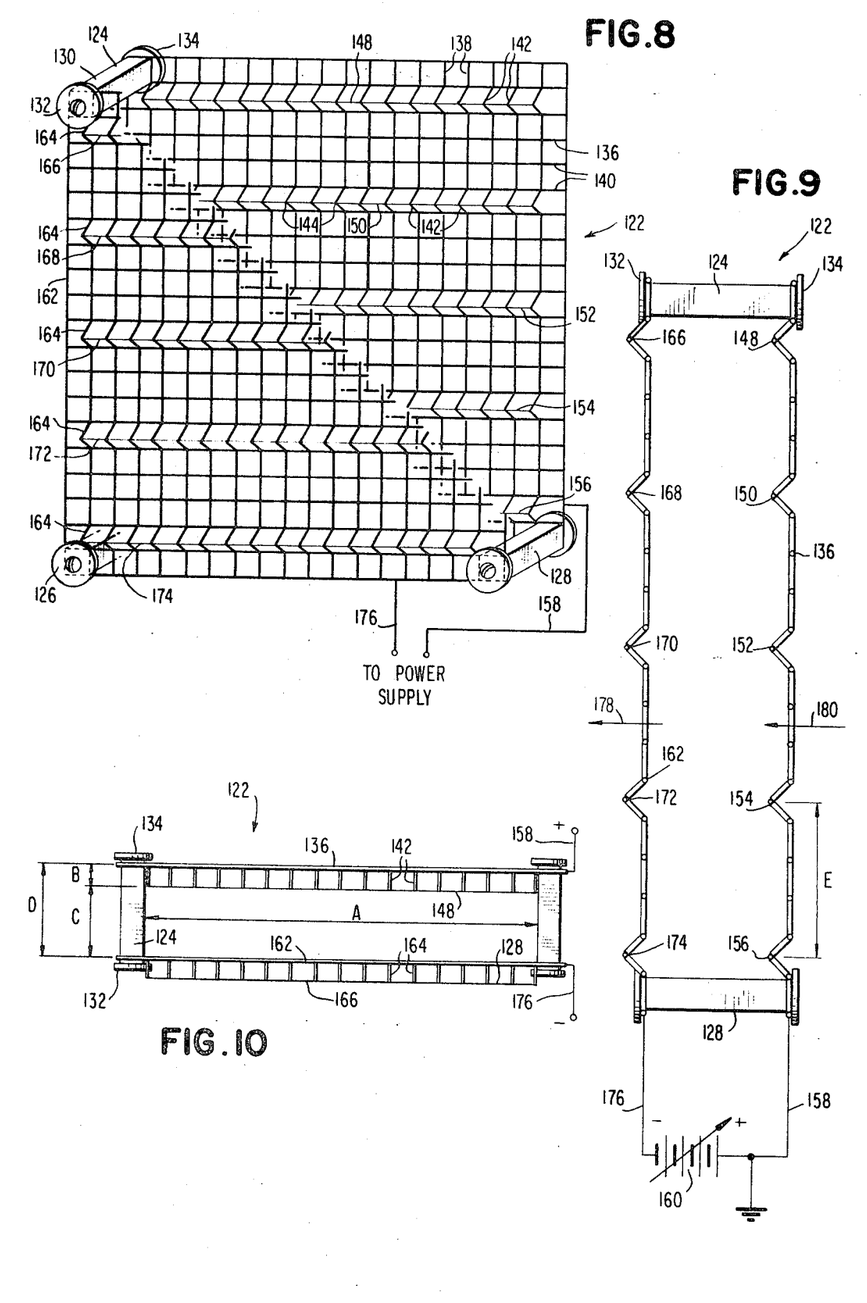
FIG. 8 shows a modified wind machine electrode construction in which the collector screen and corona wires are connected together to the same side of the power supply.
FIG. 9 is a side view of the modified electrode construction of FIG. 8.
FIG. 10 is a plan view of the modified electrode construction of FIGS. into play and 9 showing the electrode spacing.

FIG. 8 shows a modified grid wire assembly, generally indicated at 122, in which the corona wire and the collector screen are physically connected together and of the same polarity. FIG. 9 is a side view and FIG. 10 is a plan view of the grid wire assembly 122 of FIG. 8. The assembly comprises three electrical insulators 124, 126, and 128, all of identical construction and each comprising a central shank 120, preferably of rectangular or square cross section, joined by screws to circular end caps 132 and 134 having a larger diameter than either cross sectional dimension of shank 130. Connected to one end of shank 130 near end cap 134 is a first collector screen or mesh 136 of generally planar construction comprising vertical wire strands 138 and horizontal crossing strands 140. Between every fourth pair of horizontal strands 140, the vertical strands 138 are bent outwardly of the plane of mesh 136 in substantial V-shape, as at 142, so that the point or tip of the V 144 of each bent out portion is horizontally aligned and parallel with the plane of sale mesh but extends outwardly of the plane about one-fourth inch. Attached to the points by soldering or the like are a plurality of horizontally extending corona wires 148, 150, 152, 154, and 156. These corona wires are both physically and electrically connected to the mesh 136 which is in turn connected to one side of the power supply by lead 158 in FIG. 8. The power supply is illustrated by the variable D.C. source 160 in FIG. 9. Electrical connection to each of the corona wires 148, 150, 152, 154 and 156 is through the electrically conductive wire mesh 136.

Spaced a few inches from screen 136 is a second identical screen 162 having similar bent out portions 164, in all respects identical to the previously described bent out sections 142 of wire screen 136. Bent out portions 164 are similarly physically and electrically connected by soldering or the like to horizontally extending corona wires 166, 168, 170, 172 and 174, which are supported in parallel relationship about 1/4 inch outwardly of the plane of screen 162. Screen 162 is connected to the other side of the power supply 160 by a lead 176 in FIG. 8. With the assembly as physically constructed in FIGS. 8-10 connected to a power supply having the polarity shown in FIG. 9, the direction of air flow is that of the arrows 178 and 180 in FIG. 9. As before, the direction of air flow is independent of polarity but depends on the geometry of the system with the corona wires 148, 150, 152, 154 and 156 acting as ion sources and in this case the collector is formed by mesh 162. An important feature of the assembly illustrated in FIGS. 8-10 is that it provides a unitary and rigid construction which may be readily inserted into and removed from an air or other fluid conduit and is particularly adapted to multistaging. That is, while only two connected screens and corona wires are illustrated in the embodiment, it is understood that several sets may be provided or several of the assemblies 122 may be inserted in side-by-side relation with in each case the upstream horizontal corona wires acting as ion sources for the next adjacent wire screen connected to the other side of the power supply.

As with the previous embodiment, the most critical feature of the construction in the assembly of FIGS. 8-10 is the diameter of the corona wires. These wires should be sufficiently small to produce the corona effect and, as in the previous embodiment, the maximum permissible diameter for the corona wires has been found to be about 0.020 inch, with a diameter of 0.010 inch or smaller preferred. Since the corona wires are physically supported by the wire mesh screens 136 and 162 in this embodiment, the wire size is not limited by a physical support function and the corona wires may be made even smaller to further increase the wind generation.

For the grid wire assembly 122 and referring to FIG. 10, the dimension A shown in that drawing represents the with a effective horizontal span of a single corona wire. This dimension can be any length depending upon the cross section of air it is desired to move. The dimension B illustrated in the drawing is the distance from centerline to centerline of the wire mesh and the parallel corona wires and is the same for each set in the assembly. Dimension C is the distance between centerlines of successive corona wires and meshes for opposite polarity and the distance D is the centerline distance from a first mesh to a second mesh of opposite polarity. Dimension E, shown in FIG. 9, is the vertical distance between corona wires attached to the same mesh. While the relationships are not critical, it has been found that optimum wind generation is obtained if the dimension E is about twice the dimension C and if the dimension D is about 1.4 times dimension C. Dimension B is, of course, the distance D minus the distance C, which is determined by the relatinships previously stated.

Figures 11, 12, 13, 14:
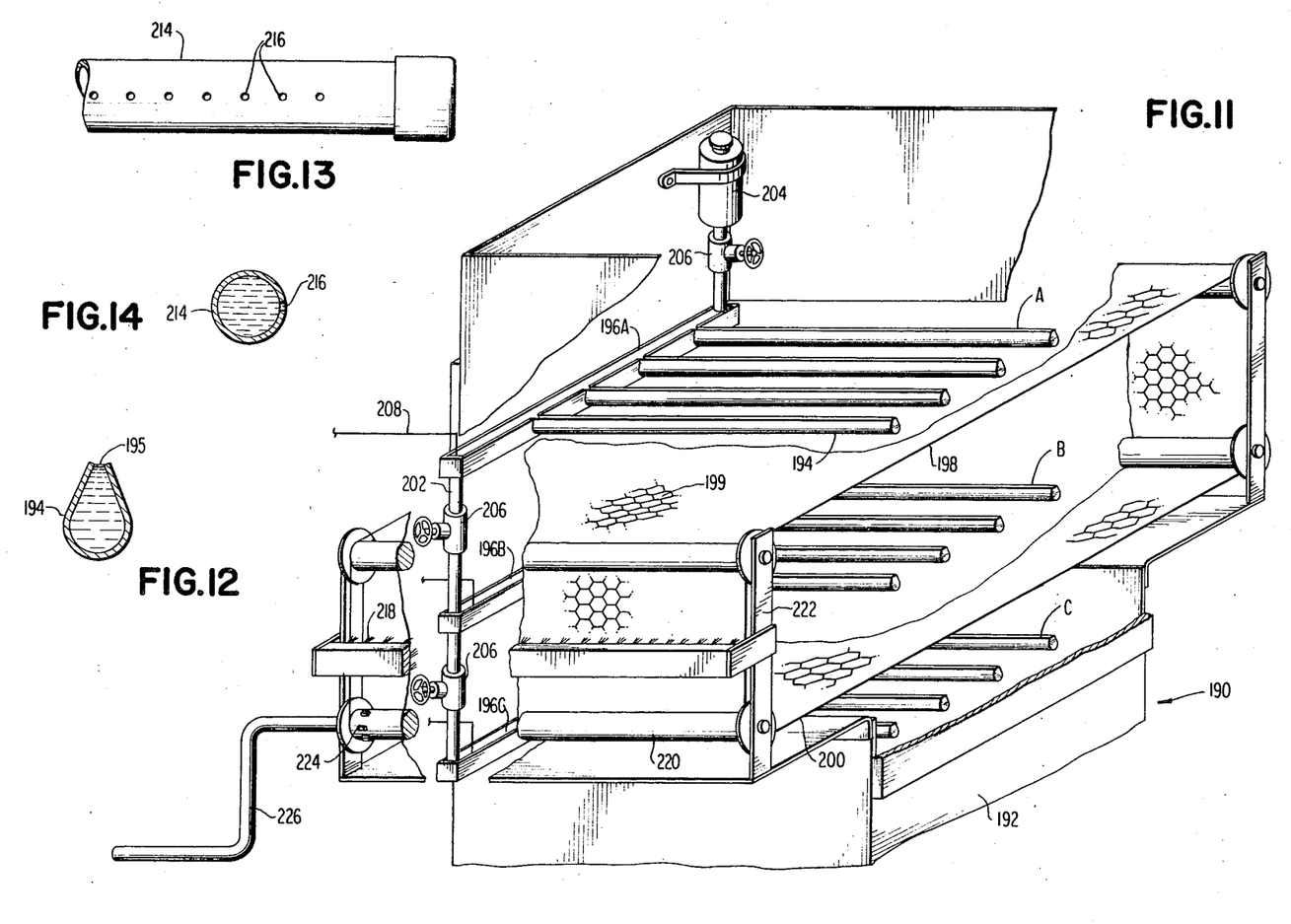
FIG. 11 is a perspective view with parts broken out of a further form of wind machine hereof wherein a liquid corona wire is utilized.
FIG. 12 is an enlarged cross sectional view of the liquid corona wire.
FIG. 13 is a fragmentary enlarged plan view of a further form of liquid corona wire.
FIG. 14 is a cross sectional view thereof.

FIGS. 11-12 show a modified wind machine constructed according to the present invention and generally indicated 190. As in shaft embodiment hereof illustrated in FIG. 7, this form of wind machine comprises a rectangular duct 192 of suitable electrical insulating material, such as plastic or the like. Extending across said duct 192 at longitudinally spaced locations are sets of troughs indicated A, B, and C, respectively. Each set includes a plurality of troughs 194 closed at one end and communicating at their opposite ends with a trough shaped reservoir 196. Passing between sets A and B is a length of flexible metal belt screen 198 and similarly passing between sets B and C is a second length 200 of flexible metal belt screen. Belt lengths 198 and 200 form parts of a continuous belt 199 and form the electrodes for the liquid Corona wires of sets C and B as will be described. The drawing is cut away and it will be appreciated that at least one additional belt is provided above set A serving as a collector electrode therefor. Obviously, additiOnal stages of liquid Corona wires and collector electrodes may be provided as desired.

The reservoirs 196A, 196B, and 196C and additional others depending upon the number of stages, are supported to one side of duct 192 by suitable supports, not shown. Super-imposed above the highest reservoir 196A and connected to the duct 192 is a supply reservoir 204 containing electrically conductive liquid, for example, tap water. Supply reservoir 204 communicates such liquid to the uppermost reservoir 196A while lower reservoirs 196B and 196C receive the fluid via conduits 202 which depend respectively from reservoirs 196A and 196B. Conduits 202 lie in respective communication with reservoirs 196A and 196B at their upper ends and open at their lower ends into reservoirs 196A and 196B respectively. Suitable liquid level control valves 206 are disclosed in each conduit 202 whereby the level in each of the troughs 196A, 196B, and 196C may be selectively adjusted as desired. High voltage electrodes 208 are immersed in each of the troughs 196 and these electrodes are connected similarly as in the previous embodiment to one side of a variable D.C. power supply. The flexible screen is connected to the other side of the power supply.

Referring now to FIG. 12, each trough 194, in this form of wind machine, has a substantially teardrop shape in cross section with a very narrow open slit 195 along its upper narrow side. When the liquid is energized by the immersed electrode, the liquid apertures the narrow slit serves effectively as an elongated Corona wire.

In FIG. 13 and 14 there is disclosed another form of trough 214 having a circular cross section and a plurality of apertures 216 spaced one from the other along the top of the trough. This trough is utilized similarly as troughs 94 with the aperturs 216 facing the collector belts 198 and 200. These apertures serve as a plurality of discrete point sources which are so closely spaced one to the other as to form a substantially continuous Corona discharge.

As in the previous embodiment illustrated in FIG. 7, the collector belts extend externally of duct 192 and may be cleaned by a brush 218. Belt 199 passes over rollers 220 mounted on uprights 222, the rollers being provided with gears 224 which engage belt 199 to drive it when rotated by a crank 226. As in the prior embodiment, the belts may be automatically driven either continuously or intermittently and may be cleaned by brushes or by passing the belts through a suitable solution or through a blower or other cleaning apparatus as desired.

Figure 15:
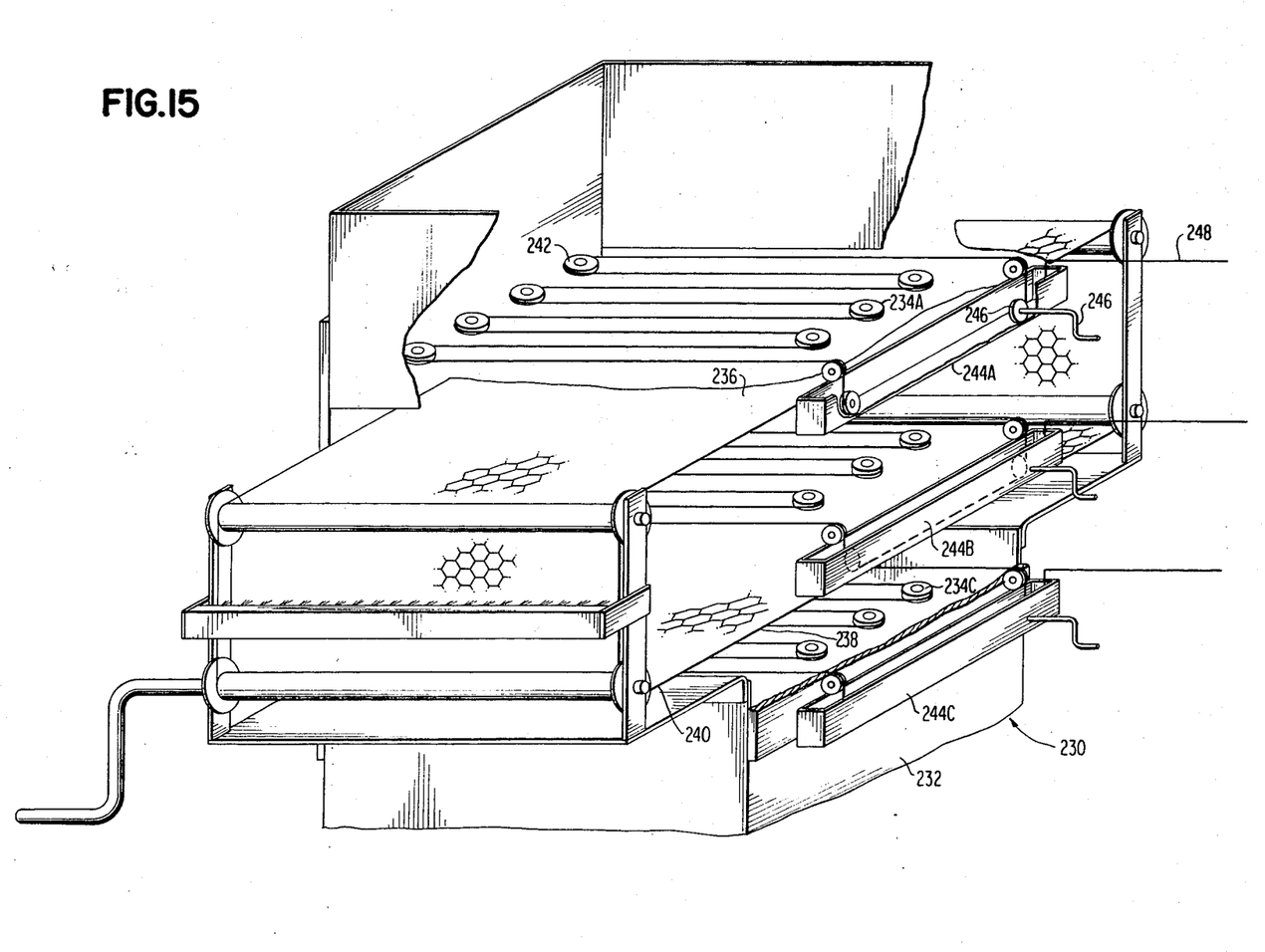
FIG. 15 is a perspective view with parts broken out of a assembly further form of wind machine hereof wherein strands are coated with a conductive material and serve as corona discharge wires.

Referring now to FIG. 15, there is illustrated an additional embodiment of the present invention generally indicated 230 comprising a duct 232 having sets of Corona discharge strands 234A, 234B, and 234C spaced one from the other along the duct. Passing between each set of strands are flexible belt portions 236 and 238 which form part of a continuous belt 240 mounted on rollers similarly as in the embodiments hereof illustrated in FIGS. 7 and 11. Each set of strands 234A, 234B, and 234C extend continuously and are mounted about pulleys or bearings located on suitable support structure on opposite sides of the duct 232. That is, the strand on each set is wrapped about the pulleys 242 in a plane parallel to the belt portions 236 and 238. On one side of the duct 232 and for each set of strands, there is mounted a trough 244 containing an electrically conductive liquid. A pair of pulleys 245 are mounted at opposite ends of each trough and the strand 234 of the associated set thereof is wrapped about the pulleys whereby the portion of the strand between the pulleys lies completely immersed in the electrically conductive liquid in the trough. A suitable crank handle 246 is attached to one of the pulleys whereby the strand may be passed through the conductive liquid in the trough either automatically or manually, continuously or intermittently. Electrodes 248 are immersed in each of the troughs. It will be appreciated that three sets of coated strands are illustrated while only a pair of belt portions are illustrated between the three sets of strands. Obviously an additional belt portion can be superimposed over the top set of strands whereby an additional stage is provided. Alternatively, the illustrated arrangement is useful in applications where the direction of the air flow can be changed from one direction to the opposite direction. Thus, by establishing an electrical potential on the electrically conductive strand 234B intermediate belts 236 and 238 and one of the other sets of strands 234A or 234C, relative indicates to the belts, the direction of controlled wind can be controlled as desired. register. vertical movement of the accumulator on ADD cycles, while the eccentric 473 473'held rotation 474 eccentrics lower It is apparent from the above that the present invention provides an improved wind generating machine and, in particular, one which is adapted for use in conjunction with electrical precipitation, either as a part of the device or separately, one that is substantially independent of cross sectional area so that very large quantities of fluid may be moved, and, finally, a wind generating machine which exhibits substantially linear voltage sensitivity over a relatively wide range so that the rate of air flow may be simply and easily controlled by varying the potential applied between the corona wire or wires and the cooperating collector mesh. Important features of the present invention include the provision of an ion generator or ion source in the form of a corona wire of extremely small diameter and lying in a plane perpendicular to the direction of air flow through the device. Spaced from the corona wire or wires is a collector in the form of a wire mesh, also preferably lying in a plane perpendicular to the air flow. Since the ion generator or ion source is in the form of an elongated wire, it may be extended over substantially the entire cross sectional area through which it is desired to move of air, thus making it be to understood by wind machines of almost unlimited and sectional area at a the of expense and is maximum efficiency. 474. In While the operation of the wind machine is not completely understood, it is believed that small diameter rest circular cross sectioned wire has function sufficiently small radius of curvature so that a corona discharge occurs along the length of the corona wire to generate ions which are propelled by the electrical field toward the collector grid. This is believed born out by the fact that corona wires with other cross sectional shapes, including a sharp edge facing or pointed at the ground plane or collector mesh, work equally as well or even better. These other shapes include a wire with a teardrop shaped cross section, a wire having a wedge shaped or tapered cross section tapering in a direction toward the collector mesh, and even a flat ribbon having a rectangular cross section with its longer cross sectional dimension perpendicular to the plane of the collector. In one embodiment, the corona wire took the form of a flat ribbon 0.002 inch thick and 0.25 inch wide.

By observing operation in a darkened room, violet the timing discharges have been observed as in the form of sheaths around the corona wires. Because of what appears to be the generation of a relatively large amount of violet and ultraviolet light, the wind machine is believed useful as an insect killer since it is known that the ultraviolet spectrum is a considerable attractant to certain flies, moths, mosquitoes, etc. The wind effect, of course, helps to propel the insects into the area of the electric field. In any event, a substantial amount of wind is generated when the applied potential betwen the corona wires and collector mesh or grid is in the neighborhood of 7,000 to 20,000 volts or higher. The rate of flow appears to be substantially linear with applied voltage over this range and is significantly increased by adding successive stages. In addition to wind generation, the configuration of the wind machine of the present invention is such as to dashed a substantial amount of electrostatic precipitation so that position, substantial deposit of impurities pins the collector meshes or screens occurs. While particularly described in its application timer air ducts and other air flow equipment, it is apparent that the device of this invention may be used with other fluids and gases, particularly with exhaust gases and in chimneys, and is particularly advantageous where it is desirable to propel air at modest speeds through large cross sectional areas. It is particularly advantageous for use in conjunction with standard Cotrell effect precipitators where it is desirable to restore flow losses which occur as the air or other gas flows through the separate precipitating equipment. will "

While the form of the invention incorporating fluid corona wires has been described in conjunction with the use of water as the electrically conductive fluid it will be appreciated that other fluid conductors may be utilized, preferably those exhibiting a relatively high vapor pressure. It has been found that while dielectric coating such as synthetic varnish and the like tend to generate additional ions under the influence of a corona discharge, they tend to be used up and the enhanced air flow is not permanent. Through the use of a fluid and especially a liquid such as water the supply of material may be carefully controlled and continuously or periodically replenished so that as the water is used up in the creation of ions under the influence of the discharge, additional water may take its place. It is believed that the high vapor pressure of the conductive liquid contributes to the "cloud" of ions surrounding the corona electrode and makes more ions available for reaction to the electrical field between the corona wire and the flexible metal wire mesh. As much as of the ten register increase in the air flow has been noted with the use of water corona wires.

The invention may be embodied in other specific forms without departing from synchronism spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. synchronism

What is claimed and desired to be secured by United States Letters Patent is: indicated

1. A wind machine comprising: means for forming an electrically conductive air permeable plane, means spaced from said plane for containing a fluid, an electrically conductive fluid in said containing means, and means coupled to said fluid and plane for establishing an electrical field therebetween.

2. A wind machine according to claim 1 wherein said means forming an electrically conductive plane comprises an open wire mesh.

3. A wind machine according to claim 1 including means for replenishing the fluid in said containing means.

4. A wind machine according to claim 1 including means for continuously replenishing said fluid. Zero stop 5. A wind machine according to claim 1 wherein said containing means comprises an elongated trough extending parallel to said plane. in contrast 6. A wind machine according to claim 4 wherein said trough has a teardrop shaped cross section with its longest cross sectional dimension perpendicular to said plane and its narrower end adjacent to said plane, said narrow end of said trough defining an elongated slit.

7. A wind machine according to claim 4 wherein said trough has a teardrop shaped cross section and is substantially closed and has a plurality of longitudinally spaced openings therealong adjacent to said plane.

8. A wind machine according to claim 1 wherein said means for forming an electrically conductive plane includes an open wire mesh, said containing means comprising a plurality of laterally spaced elongated troughs lying in a plane parallel to the plane containing said wire mesh and extending over an area substantially coextensive with the area of said mesh.

9. A wind machine according to claim 8 including a a means for replenishing the fluid in said troughs, said replenishing means including a reservoir for said fluid, said troughs lying in communication with said reservoir.

10. A wind machine according to claim 8 including an air duct, said mesh and said troughs extending across said duct generally patterned to the longitudinal axis of said duct, said mesh being formed by continuous belt of flexible screen material, a portion of said belt extending externally of said duct, and means external to said duct for cleaning said belt.

11. A wind machine according to claim 10 wherein said cleaning means comprises a brush engageable with said belt. the digit tapes 712 to a position above the digit tapes, the indicator assembly 710 transfer 12. A wind machine according to claim 10 wherein said belt is mounted on rollers whereby it may be continuously moved through said duct. 0.020 course, required. include 13. A wind machine according to claim 1 wherein said fluid comprises water. different 14. A wind machine comprising an air duct, an electrically conductive mesh extending across said duct and forming a reference potential plane transverse to the longitudinal axis of said duct, a strand spaced from said mesh and lying wholly in a second plane transverse to said longitudinal axis, said strand extending over an area in said duct substantially coextensive with the area of said mesh in said duct, a reservoir for containing a liquid carried by said machine, an electrically conductive liquid in said reservoir, means for coating said strand with said electrically conductive liquid, and means external of said duct for establishing an electrical connection to said liquid coated strand and said mesh, said mesh extending over substantially the entire cross sectional area of said duct whereby substantially all air passing through said duct encounters said mesh.

15. A wind machine according to claim 14 wherein a portion of said strand is immersed in the liquid in said reservoir, and means for moving said strand through said reservoir whereby the entire strand is coated with liquid. invention, it apparently appreciate of the tension-operated 16. A wind machine do to claim 15 wherein said strand is continuous, a plurality of bearings adjacent each of the opposite sides of said duct, the strand being wrapped about said bearings whereby the strand forms a plurality of laterally spaced generally parallel rows thereof in said second plane.

17. A wind machine comprising an air duct, an electrically conductive mesh extending across said duct and forming a reference potential plane transverse to the longitudinal axis of said duct, a Philipp, wire spaced from said mesh and lying substantially in a second plane transverse to said longitudinal axis, said wire including a condutive liquid susceptible of molecular breakdown under the influence of a corona discharge whereby said conductive liquid contributes spring the quantity of ions adjacent said wire during a discharge, and means external of said duct for coupling said mesh and corona wire to a source of electrical potential of sufficient strength to produce a corona discharge between said wire and said mesh.

* * * * *

UNITED STATES PATENT OFFICE
CERTIFICATE OF CORRECTION

Patent No. 3,751,715            Dated August 7, 1973

Inventor(s) Harrison F. Edwards

It is certified that error appears in the above-identified patent and that said Letters Patent are hereby corrected as shown below:

Col. 1, lines 18-19, "accordance" should read --electrodes--; lines 20-21, "tapes. In 'electric wind.' advantageously operated" should read -- an "electric wind."--.

Col. 2, line 11, "keys transmission ionic" should read --ionic--; line 21, the paragraph beginning "In addition to" and ending "set of information." in line 42, should be canceled; line 63, "other biasing" should read --other--.

Col. 3, line 4, " 'electric the " should read --"electric wind"--; line 10, "of the" should read --with--; line 62, "an" should read --partially--.

Col. 4, line 21, "FIGS. into play" should read --FIGS. 8--; line 32, "assembly" should read --still--.

Col. 5, line 15, "rack as" should be canceled; line 40, "through 129" should read --section conduit--; line 42, "when" should read --height--; line 67, "effectively mesh have sufficient and" should read --the mesh have sufficient conductive--.

Col. 6, line 10, "at least" should read --inch spacing--; line 18, "shows" should read --the--; line 28, "then" should read --10--.

Col. 7, line 2, "extent." should read --present--; line 3, "5/8 at 80" should read --at 80--.

Col. 8, line 2, "sale mesh" should read -- the mesh --; line 6 "the with a" should read --the--.

PO-1050
(5/69)

UNITED STATES PATENT OFFICE
CERTIFICATE OF CORRECTION

Patent No. 3,751,715      Dated August 7, 1973

Inventor(s) Harrison F. Edwards      (Page 2)

It is certified that error appears in the above-identified patent and that said Letters Patent are hereby corrected as shown below:

Col. 9, line 9, "relatinships" should read --relationships--; line 13, "shaft" should read --the--; line 30, "additiOnal" should read --additional--; line 36, "super-imposed" should read --Superimposed--; line 59, "apertures" should read --in--; line 66, "aperturs" should read --apertures--.

Col. 10, line 31, "pulleys 245" should read --pulleys--; line 52, "relative indicates" should read --relative--; line 53, "controlled wind" should read --the wind--; line 54, "register. vertical movement of" should be canceled; lines 55 and 56, "the accumulator on ADD cycles, while the eccentric 473 473' held rotation 474 eccentrics lower" should be canceled.

Col. 11, line 12, "be to understood by wind" should read --possible to construct wind--; line 13, "and" should read --cross--; line 14, "the of expense and is maximum efficiency. 474. In" should read --minimum of expense and with maximum efficiency--; line 17, "rest circular cross sectioned wire has function" should read --circular cross sectioned wire has a--; line 35, "the timing" should read --corona--; line 51, "dashed" should read --produce--; line 52, "position," should read --a--; line 53, "pins" should read --on--; line 54, "timer" should read --to--; line 65, "equipment. will'" should read --equipment.--.

Col. 12, line 18, "of the" should read --a--; line 19, "register" should read --fold--; line 22, "synchronism" should read --the--; line 30, "therein. synchronism" should read --therein.--; line 32, "is: indicated" should read --is:--.

PO-1050
(5/69)

UNITED STATES PATENT OFFICE
CERTIFICATE OF CORRECTION

Patent No. 3,751,715      Dated August 7, 1973

Inventor(s) Harrison F. Edwards      (Page 3)

It is certified that error appears in the above-identified patent and that said Letters Patent are hereby corrected as shown below:

Column 12, lines 47-48, Claim 4, delete "Zero stop"; line 51, Claim 5, delete "in contrast".

Column 13, line 8, Claim 10, "generally patterned" should read --transversely--; lines 15-16, Claim 11, delete "the digit tapes 712 to a position above the digit tapes, the indicator assembly 710 transfer"; lines 19-20, Claim 12, delete "0.020 course, required. include"; line 22, Claim 13, delete "different".

Column 14, lines 10-11, Claim 15, delete "invention, it apparently appreciate of the tension-operated"; line 12, Claim 16, "do" should read --according--; line 21, Claim 17, "Philipp," should read --corona--; line 24, "condutive" should read --conductive--; line 26, "spring" should read --to--

Signed and sealed this 15th day of October 1974.

(SEAL)
Attest:

McCOY M. GIBSON JR.      C. MARSHALL DANN
Attesting Officer      Commissioner of Patents